Oct. 3, 1933.   P. UPHAM   1,929,195
LUBRICATING APPARATUS
Filed April 17, 1930   2 Sheets-Sheet 2
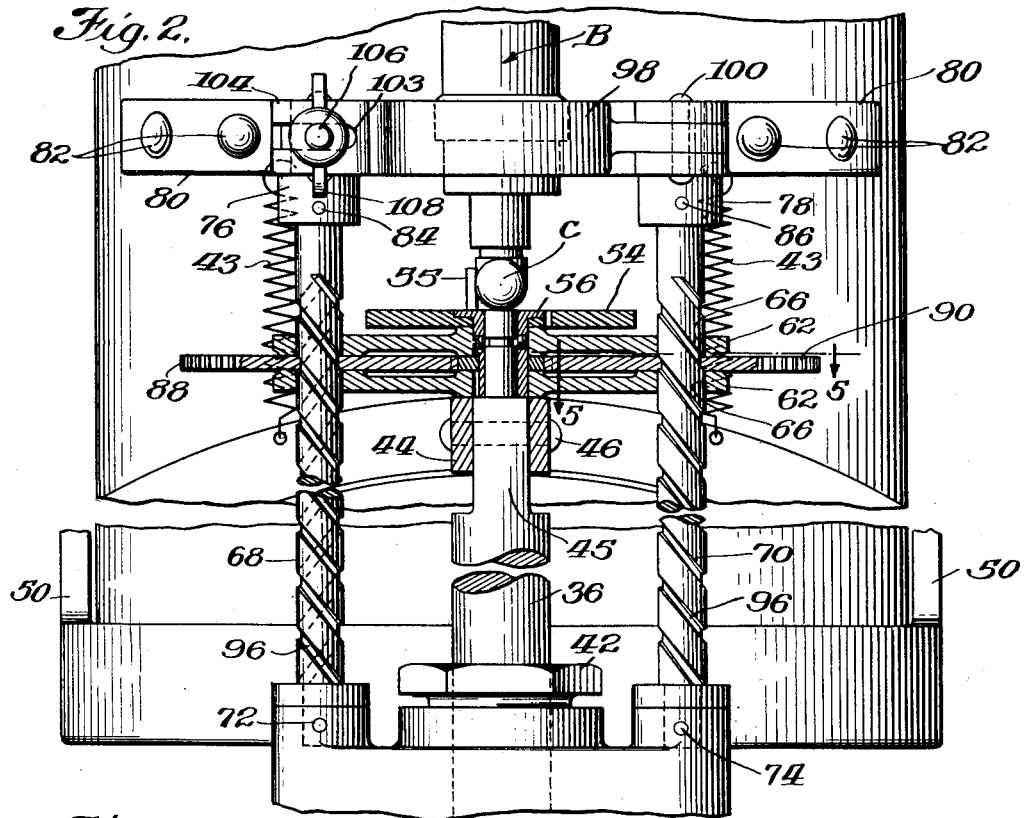
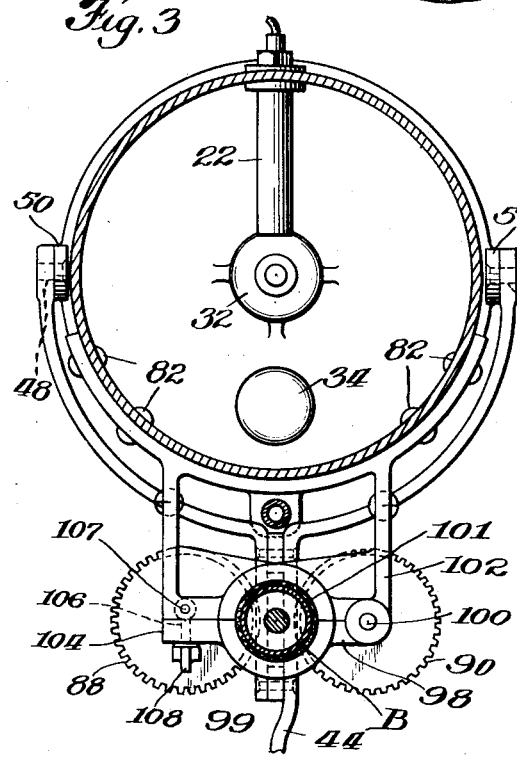
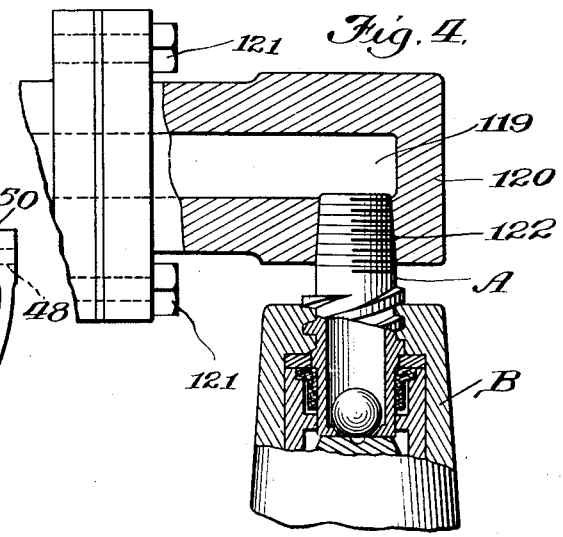
Inventor
Preston Upham
By Williams, Bradbury
McCaleb & Hinkle   attys.

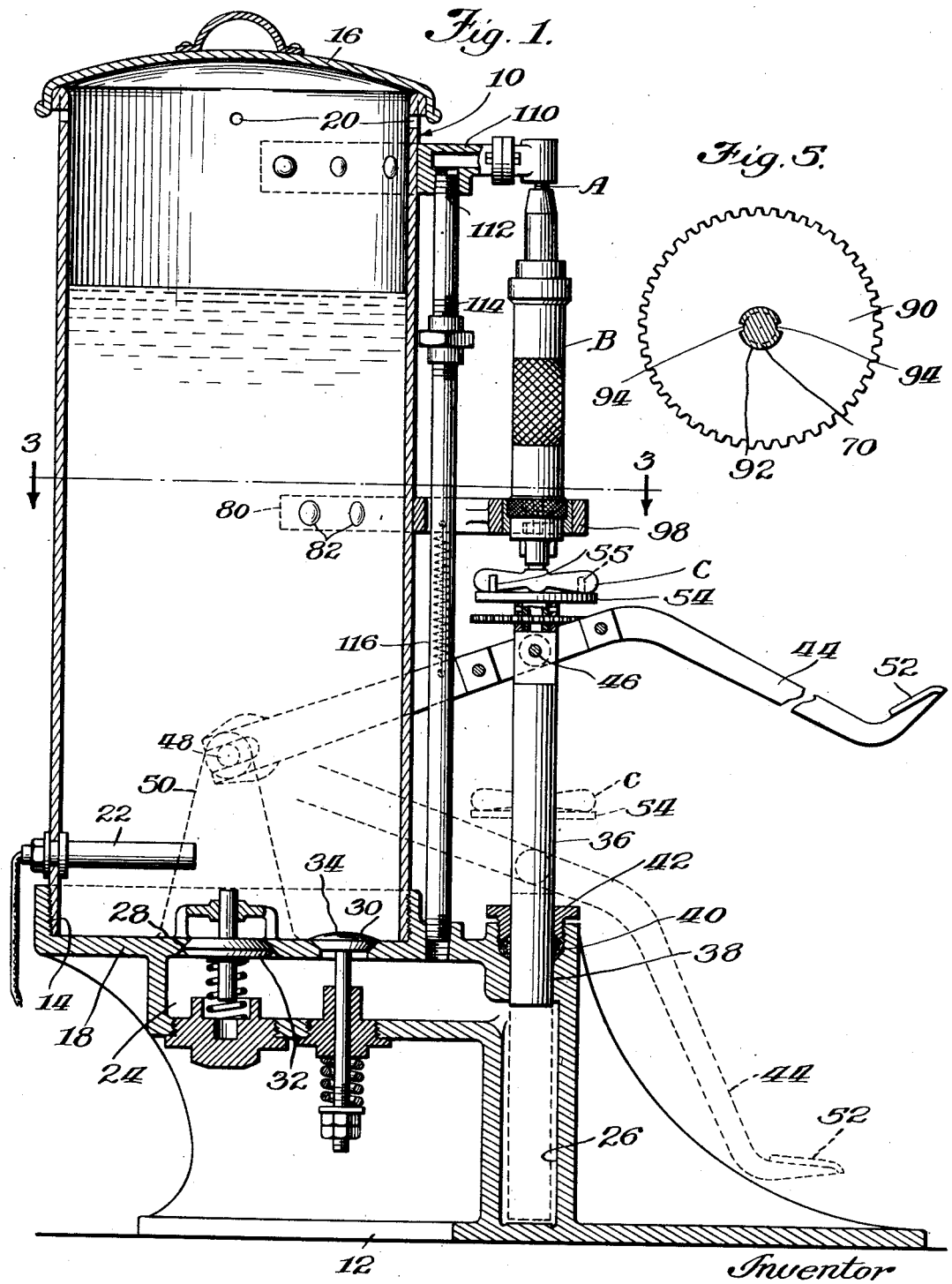

Patented Oct. 3, 1933

1,929,195

UNITED STATES PATENT OFFICE 1,929,195

LUBRICATING APPARATUS

Preston Upham, Brookline, Mass., assignor to Alemite Corporation, Chicago, Ill., a corporation of Delaware Application April 17, 1930. Serial No. 445,038

14 Claims. (Cl. 221—47.5)

This invention relates to lubricating apparatus and more particularly to improvements in apparatus for charging or filling lubricant compressors and the method of doing the same. The compressors to which this method and apparatus apply are of the well-known types having a cylindrical reservoir, a plunger and plunger rod extending through one end having a handle, and the cylindrical reservoir having a nozzle at its other end adapted to engage a lubricant fitting. The present method of filling these compressors with lubricant is to unscrew the cap at the handle end, withdraw the plunger, and manually fill the cylindrical reservoir with lubricant and then replace the plunger and cap.

One of the principal objects of my invention is the provision of an improved method of charging lubricant compressors of the type mentioned by forcing lubricant into the compressor through the nozzle end as the plunger therein is retracted.

A further object of my invention is to provide an improved filling mechanism for lubricant compressors which simultaneously retracts the compressor plunger and charges the lubricant chamber.

A further object of my invention is to provide an improved lubricant compressor filling device for screw type compressors which will perform the double function of retracting the compressor plunger, thereby enlarging the cylinder, and simultaneously charging the cylinder with lubricant.

A further object of the invention is to provide a device of the type specified which will fill lubricant compressors in a minimum amount of time, will require only a simple operation, and to which and from which a compressor may be easily attached or detached.

A further object of the invention is to provide improved filling means for lubricant compressors whereby no leakage is possible and any overflow is returned to the lubricant reservoir.

Other objects and advantages of my invention will appear more fully from the following description and from the accompanying drawings, in which shimilar characters of reference indicate similar parts throughout the several views.

Fig. 1 is a cross-sectional view of the lubricant reservoir and base showing a compressor in position to be filled;

Fig. 2 is an enlarged fragmentary front elevational view of the compressor holding means and associated parts, parts being broken in section to show other parts;

Fig. 3 is a plan sectional view taken on the line 3—3 of Fig. 1;

Fig. 4 is an enlarged fragmentary view of the upper end of the compressor and associated parts; and Fig. 5 is an enlarged plan sectional view taken on the line 5—5 of Fig. 2.

Referring now to the drawings, of which there are two sheets, I have shown a tank or lubricant reservoir 10 mounted upon a base 12, which base may be rigidly fastened to a foundation or mounted upon a movable truck as desired.

Base member 12 is provided with a tapped upper opening 14 into which the lower end of tank 10 is screw-threadedly secured. The tank is closed at its upper end by a removable cover plate 16 and at its lower end by a horizontal wall portion 18 of base 12. Breather or air holes 20 are provided near the upper end of the tank and a typical heating element 22, such as the one shown, is fixedly secured to and extends inside of the tank near its lower end. The purpose of the heating element is to thin hard or plastic lubricants if it is desired.

A pasageway 24 extends below the horizontal wall 18 and communicates with a vertical cylindrical chamber 26 in base member 12. A pair of openings 28 and 30 in wall 18 are closed by spring pressed valves 32 and 34. As is apparent from the drawings (Fig. 1) these values may be actuated in one direction only, valve 28 opening downwardly and valve 34 upwardly. It will be noted that the spring of valve 28 is considerably weaker than the spring of valve 34 for a reason which will be hereinafter more apparent.

A vertically positioned plunger 36 is reciprocably mounted in a cylindrical bore 38 directly above chamber 26. A gasket 40 and follower 42 are provided at the open end of bore 38 to furnish a leak-proof seal around plunger 36. Means to reciprocate plunger 36 are provided and consist of a lever 44 attached to a reduced portion 45 of the plunger near its upper end by a cross-pin 46. The lever is split to encircle tank 10 and is pivoted on pivot pins 48 mounted in brackets 50 on each side thereof (Fig. 3) formed integral with base 10. At its outer end lever 44 may be connected in any well-known manner to a source of power or it may be formed, as shown in the drawings, with a pedal 52 to manually reciprocate plunger 36. Springs 37 are connected between lever 44 and a bracket 80 to return the plunger and associated elements to the normal position shown in the drawings (Fig. 1).

A platform 54 is mounted on a sleeve member 56, carried by the reduced stem 58 of plunger 36. A gear wheel 60 is keyed to sleeve 56 and positioned above and below the gear wheel are spacers 62. The spacers extend to each side and have a pair of apertures 64 and 66 through which a pair of lead screws 68 and 70 pass. These lead screws have reduced ends which are fixedly mounted in suitable openings in base member 10 and secured in place by locking pins 72 and 74. The lead screws 68 and 70 are secured at their upper ends in bosses 76 and 78 of a bracket 80 which is attached to tank 10 by means of rivets 82. Locking pins 84 and 86 pass through the upper ends of the lead screws and into bosses 76 and 78.

A pair of planetary gears 88 and 90 are horizontally positioned opposite gear wheel 60 and in mesh therewith. Gears 88 and 90 each have a central aperture 92 adapted to thread onto the lead screws 68 and 70 having a pair of lugs 94 which engage the thread grooves 96.

Above platform 54 a compressor clamping unit 98 is pivotally mounted on a bearing pin 100 in an extended arm 102 of bracket 80. Clamping unit 98 is formed with a semicircular opening 99 opposite a similar opening 101 in bracket 80, which openings in the closed position of clamp 98 form a circular aperture. The clamping unit 98 also has an elongated opening 103 in its free end 104.

A latching means is provided adjacent the free end of the clamping unit 98 and may comprise an eye-bolt 106 pivotally mounted on a stud 107 in bracket 80 having a wing-nut 108 screw-threaded thereon.

Means are provided near the upper end of reservoir 10 for rigidly holding the discharge end of a lubricant compressor, and comprises a bracket 110 secured to the reservoir by rivets 112. Bracket 110 has a tapped opening 112 in its lower surface into which a conduit pipe 114 is screw-threadedly secured. Conduit pipe 114 is suitably connected by a pipe union to another conduit 116 which extends down to base 12 and is in communication with passageway 24. Bracket 110 has an internal chamber 118 communicating with opening 112 and also with a passageway 119 in a fitting support member 120. The fitting support member 120 is attached to a flange on bracket 110 by means of set screws 121 and has a tapped opening 122 in its lower face into which a fitting A is screw-threadedly secured.

Fitting A is of a well-known type commonly known in the art, provided with plural threads upon its exterior periphery for engagement with cooperating threads on the nozzle of a lubricant compressor. An empty lubricant compressor B, which it is desired to fill, is shown attached to fitting A extending downwardly therefrom with its handle portion C resting upon platform 54 between a pair of guide pins 55.

The lubricant compressor B is of the type described in the co-pending application of Howard J. Murphy, filed February 11, 1925, bearing Serial #8,584, and will not be described here in any great detail. It will be sufficient in this application to state that the compressor is provided with the usual screw-operated type plunger for extruding lubricant under pressure, by advancing the plunger upon rotation of the handle C. Similarly, to retract the plunger from the nozzle end of the compressor to the opposite end, the handle C is reversely rotated.

To charge a lubricant compressor of the type described with my improved apparatus, clamp 90 is opened by rotating it away from bracket 80 on pin 100. A compressor B is attached to fitting A in the manner described and suspended therefrom, with its handle C resting on platform 54.

The clamping unit is now swung to its closed position, a portion of compressor B being enclosed by the semicircular openings 99 and 101. Packing material D is wrapped around the compressor B at this point before the clamping is done, thereby effectively holding the compressor against turning, yet allowing a certain amount of sideplay due to the compressiblity of the packing.

Assuming that there is a quantity of lubricant in reservoir 10 and that chamber 24, cylinder 26 and conduits 114, 116 have been filled with lubricant by a continued reciprocation of plunger 36, and that a compressor B is attached to fitting A, its handle C resting on platform 54, downward pressure on lever 44 will cause platform 54 to rotate in a counter-clockwise direction through the medium of gears 88 and 90 which rotate on lead screws 68 and 70 and drive gear 60 attached to platform 54. Handle C resting on platform 54 between guide pins 55 will thus be rotated and the plunger rod of the compressor will be unscrewed or backed out of the compressor, withdrawing the plunger also and gradually enlarging the compressor cylinder. Simultaneously with this operation plunger 36 is entering cylinder 26, displacing lubricant and causing it to flow through conduits 114 and 116, the passageways in bracket 110 and fitting support member 120, and through fitting A through the nozzle of compressor B into the cylinder.

It is obvious that compressor B is being charged or filled with lubricant under pressure as rapidly as the plunger is withdrawn, thus permitting no air to enter the chamber as the plunger is withdrawn, assuring a filling operation which will charge the compressor efficiently and quickly.

Clamp 98 is now swung open and compressor B removed by unscrewing it from fitting A. After the compressor is removed springs 43 will operate to restore lever 44 to normal position, withdrawing plunger 36 from cylinder 26, and causing valve 28 to open and to allow lubricant to fill chamber 24 and cylinder 26.

It will be apparent from the drawings that the capacity of compressor B is equal to the displacement of plunger 36 in cylinder 26. When it is desired to fill a compressor of a smaller capacity, check valve 34 serves to allow surplus lubricant to be forced into reservoir 10.

While I have shown and described one embodiment of my invention, I desire it to be understood that many other types of compressors may be filled by this method and with this apparatus. For example, compressors of the type shown in Patent No. 1,307,733, issued to Arthur V. Gullborg, may be filled by substituting the fitting of the Gullborg patent for the fitting A described and interconnecting the Gullborg compressor and fitting in the manner explained in the patent. It is evident that any compressor having a nozzle end for attachment to a fitting, may be charged by the same apparatus, the only necessary labor being to substitute the particular type of fitting adapted to the compressor in place of fitting A.

Having thus described my invention, what I claim and desire to secure by United States Letters Patent is as follows:

1. Apparatus for filling lubricant compressors including a base member, a high pressure cylinder in said base, a reservoir mounted on said base in communication with said high pressure cylinder, means attached to said reservoir for rigidly supporting a lubricant compressor including means attachable to the discharge end of the compressor in communication with said high pressure cylinder, and means manually operable for simultaneously retracting the compressor plunger and plunger rod and charging the compressor with lubricant.

2. Apparatus for charging lubricant compressors, including a base member, a reservoir mounted thereon, a high pressure cylinder in communication with said reservoir, a bracket having a passageway therein communicating with said high pressure cylinder, a standard lubricant fitting mounted in said bracket through which lubricant is forced from said cylinder into the nozzle of a lubricant compressor attached thereto and means manually operable for simultaneously retracting the compressor plunger and plunger rod and charging the compressor with lubricant.

3. A device for charging lubricant compressors including a source of lubricant under pressure, a valved lubricant fitting supplied with said lubricant, the valve of said fitting adapted to be opened by attaching a nozzle of a lubricant compressor to said fitting to allow lubricant to flow into said compressor and means manually operable for simultaneously retracting the compressor plunger and plunger rod and charging the compressor with lubricant.

4. A device for charging lubricant compressors including a lubricant reservoir, a high pressure cylinder, a plunger therein, a revolvable platform associated with said plunger, a lever for actuating said plunger, conduits extending from said cylinder to a valved lubricant fitting, said fitting adapted to be attached to a compressor to be filled, said compressor having its handle resting on said platform, and means on said platform for revolving said handle as the plunger is actuated.

5. A device for charging lubricant compressors including a lubricant reservoir, a high pressure cylinder, a plunger therein, a revolvable platform associated with said plunger, a lever for actuating said plunger, conduits extending from said cylinder to a valved lubricant fitting, said fitting adapted to be attached to a compressor to be filled, said compressor having its handle resting on said platform, means on said platform for revolving said handle as said plunger is actuated, and clamping means for rigidly holding said compressor against movement.

6. Apparatus for charging lubricant dispensing compressors including a source of lubricant under pressure, means associated therewith for rigidly supporting a lubricant compressor by its discharge end and establishing communication therewith through said end, and means manually operable for simultaneously retracting the compressor plunger and plunger rod and charging the compressor with lubricant.

7. Apparatus for charging compressors having screw type plungers therein, including a lubricant reservoir, a pressure cylinder and plunger associated therewith, a revolving platform at the upper end of said plunger, a lubricant fitting and passageway from said cylinder to said fitting, clamping means for supporting a lubricant compressor, said compressor adapted to be attached to said fitting and supported in said clamping means having its handle inverted and resting on the revolvable platform, and means associated with said plunger and said platform for simultaneously retracting the compressor plunger and forcing lubricant under pressure into the compressor through the fitting.

8. Apparatus for charging compressors having screw type plungers therein, including a lubricant reservoir, a pressure cylinder and plunger associated therewith, a revolving platform at the upper end of said plunger, a lubricant fitting, a passageway from said cylinder to said fitting, clamping means for supporting a lubricant compressor, said compressor adapted to be attached to said fitting and supported in said clamping means having its handle inverted and resting on the revolvable platform, means associated with said plunger and said platform for simultaneously retracting the compressor plunger and forcing lubricant into the compressor through the fitting, and means for returning surplus lubricant to the reservoir when the compressor is filled.

9. A device for charging lubricant compressors including a lubricant reservoir, a heating element therein for reducing to a fluid state semi-hard or plastic lubricant, a high pressure cylinder, a plunger therein, a revolvable platform associated with said plunger, a lever for actuating said plunger, conduits extending from said cylinder to a valved lubricant fitting, said fitting adapted to be attached to a compressor to be filled, said compressor having its handle resting on said platform, means on said platform for revolving said handle as said plunger is actuated, and clamping means for rigidly holding said compressor against movement.

10. A device for charging lubricant compressors including a lubricant reservoir, a high pressure cylinder, a plunger therein, a revolvable platform mounted on the top of said plunger, a lever for actuating said plunger, conduits extending from said cylinder to a valved lubricant fitting, said fitting adapted to be attached to a compressor to be filled, said compressor having its handle resting on said platform, means on said platform for revolving said handle as said plunger is actuated, and clamping means for rigidly holding said compressor against movement.

11. A device for charging lubricant compressors including a lubricant reservoir, a high pressure cylinder, a plunger therein, a platform mounted on the top of said plunger, a horizontal gear thereon, a pair of planetary gears on opposite sides of said first-named gear meshing therewith, a pair of vertically positioned lead screws, said planetary gears threadedly mounted thereon and adapted to rotate said first-named gear while ascending or descending said lead screws, a lever for actuating said plunger, a conduit extending from said cylinder to a valved lubricant fitting, said fitting adapted to be attached to a compressor to be filled, said compressor having its handle resting on said platform, means on said platform for revolving said handle when said plunger is actuated, and clamping means for rigidly holding said compressor against movement.

12. Apparatus for charging compressors having screw type plungers therein, including a lubricant reservoir, a pressure cylinder and plunger associated therewith, a lubricant fitting, a passageway from said cylinder to said fitting, clamping means for supporting a lubricant compressor, a revolvable platform, said compressor adapted to be attached to said fitting and supported in said clamping means with its handle inverted and resting on the revolvable platform, and a pedally-operated lever for simultaneously retracting the compressor plunger and forcing lubricant into the compressor through the fitting.

13. A device for charging lubricant compressors comprising a lubricant reservoir, a high pressure cylinder communicating with said lubricant reservoir, a plunger operable in said cylinder, means for manually securing the compressor to be filled in position to receive lubricant discharged from said cylinder, means operable by said plunger to retract the operating handle of the compressor, and means for returning said plunger to operating position upon removal of said compressor from filling position.

14. A device for charging lubricant compressors comprising a lubricant reservoir, a high pressure cylinder communicating with said lubricant reservoir, a plunger operable in said cylinder, means for manually securing the compressor to be filled in position to receive lubricant discharged from said cylinder, means operable by said plunger to retract the operating handle of the compressor, means for returning said plunger to operating position upon removal of said compressor from filling position, and means openable upon the complete filling of said compressor to allow the excess lubricant pumped from said cylinder to return to said reservoir.

PRESTON UPHAM.